United States Patent
Ishii

(10) Patent No.: US 8,704,461 B2
(45) Date of Patent: Apr. 22, 2014

(54) VEHICLE LIGHTING DEVICE

(71) Applicant: Ichikoh Industries, Ltd., Isehara (JP)

(72) Inventor: Satoru Ishii, Isehara (JP)

(73) Assignee: Ichikoh Industries, Ltd., Isehara-shi (JP)

( * ) Notice: Subject to any disclaimer, the term of this patent is extended or adjusted under 35 U.S.C. 154(b) by 0 days.

(21) Appl. No.: 13/687,721

(22) Filed: Nov. 28, 2012

(65) Prior Publication Data

US 2013/0169152 A1 Jul. 4, 2013

(30) Foreign Application Priority Data

Dec. 28, 2011 (JP) ................................. 2011-289992

(51) Int. Cl.
G05F 1/00 (2006.01)

(52) U.S. Cl.
USPC ........... 315/307; 315/308; 315/309; 315/224; 315/291; 315/77

(58) Field of Classification Search
USPC ......... 315/77, 82, 185 R, 224, 247, 291, 300, 315/302, 307–309, 312
See application file for complete search history.

(56) References Cited

U.S. PATENT DOCUMENTS

| | | | |
|---|---|---|---|
| 7,205,680 B2 | 4/2007 | Takeda et al. | |
| 7,638,947 B2 * | 12/2009 | Ito et al. | 315/77 |
| 8,274,237 B2 * | 9/2012 | Nagase et al. | 315/247 |
| 2004/0179368 A1 | 9/2004 | Takeda et al. | |
| 2007/0170876 A1 | 7/2007 | Ito et al. | |
| 2007/0182337 A1 | 8/2007 | Kunjappan | |
| 2011/0169496 A1 | 7/2011 | Fried | |
| 2012/0187863 A1 * | 7/2012 | Nonaka et al. | 315/291 |

FOREIGN PATENT DOCUMENTS

| | | |
|---|---|---|
| JP | 2004-276738 A | 10/2004 |
| JP | 2006-114279 A | 4/2006 |
| JP | 2010-141137 A | 6/2010 |

* cited by examiner

Primary Examiner — Haiss Philogene

(74) Attorney, Agent, or Firm — Foley & Lardner LLP

(57) ABSTRACT

A vehicle lighting device according to the present invention is configured in such a manner that a current that is supplied to a light emitting element that serves as a light source can be controlled with low power consumption in accordance with either of a voltage change in input power supply and a change in ambient temperature. This vehicle lighting device is configured in such a manner as to take out a reference voltage that is input to a switching controller 5 from a voltage dividing resistor R2 that is connected between a constant voltage source Vcc and a ground terminal GND. A current control circuit 10C for voltage change is provided to between an input power supply Vin and the ground terminal GND. Further, a current control circuit 10A for temperature change is provided to between the constant voltage source Vcc and the ground terminal GND.

7 Claims, 4 Drawing Sheets

VEHICLE LIGHTING DEVICE

CROSS REFERENCE TO RELATED APPLICATIONS

This application claims priority of Japanese Patent Application No. 2011-289992 filed on Dec. 28, 2011. The contents of the application are incorporated herein by reference in their entirety.

BACKGROUND OF THE INVENTION

1. Field of the Invention

The present invention relates to a vehicle lighting device, and in particular, provides a vehicle lighting device in which a light emitting element is employed as a light source.

2. Description of the Related Art

A light emitting element such as a light emitting diode has a feature that a luminous intensity of light changes depending on a value of a current that is supplied thereto. In view of such a circumstance, a vehicle lighting device in which a light emitting element is employed as a light source is configured in such a manner that the current that is supplied to the light emitting diode is converted to a voltage, the converted voltage is detected, and in accordance with the detected voltage, a substantially constant current is supplied to the light emitting diode.

In this case, it has been known that the light emitting element is configured in such a manner that in consideration of an unexpected decrease of a vehicle power supply (an input power supply), the detected voltage is compared with a value of a voltage that is taken out from a voltage dividing resistor that is connected between the power supply terminal and a ground terminal, and the current that is supplied to the light emitting diode is controlled in accordance with a difference therebetween. FIG. 5 shows the thus configured vehicle lighting device, in other words, a vehicle lighting device in such a manner that a current that is supplied to a light emitting diode 3A is converted to a voltage by means of a voltage detection resistor 2, the converted voltage (the detected voltage) is input to a switching controller 5, and a voltage dividing value of a resistor R21, which can be taken out from a middle connection point in series of a resistor R20 and the resistor R21 that are connected between an input power supply terminal Vin and a ground terminal GND, is input to the reference voltage detecting circuit 5B. A reference voltage detecting circuit 5B is provided with an internal reference voltage in such a manner that, in a case where the voltage dividing value is greater than the internal reference voltage, a constant current is output, or alternatively, in a case where the above value is smaller, an output current is decreased. In this manner, even in a case where a voltage of the input power supply terminal Vin decreases, the current that is supplied to the light emitting diode 3A is decreased.

In addition, it has been known that a vehicle lighting device is configured in such a manner that, in consideration of a change in feature that is exerted by a temperature of a circuit element or the like, the detected voltage is compared with a value of a voltage that is taken out from a voltage dividing resistor made of a thermistor that is connected between a constant voltage source and a ground terminal, and in accordance with a difference therebetween, a current that is supplied to a light emitting diode is controlled. FIG. 6 shows the thus configured vehicle lighting device, in other words, a vehicle lighting device in such a manner the current that is supplied to the light emitting diode 3A is converted to a voltage by means of the voltage detection resistor 2, the converted voltage (the detected voltage) is input to the switching controller 5, and a voltage dividing value, which changes depending on a temperature from a middle connection point in series of the resistor E23 and a thermistor TM3 that are connected to a constant voltage source Vcc and a ground terminal GND, is input to the reference voltage detecting circuit 5B. The reference voltage detecting circuit 5B is divided as described above, and even in a case where an ambient temperature changes, the current that is supplied to the light emitting diode 3A is decreased.

It is to be noted that FIG. 5 and FIG. 6 are views, each of which is drawn in association with FIG. 1 that shows an embodiment of the present invention. Therefore, for a detailed view of another configuration other than those in the foregoing descriptions of FIG. 5 and FIG. 6, reference should be made to a description that is associated with FIG. 1. A technique related to the present invention is found in Japanese Unexamined Patent Application Publication No. 2004-276738, for example. In this publication, there is disclosure of a technique in which a temperature in a vehicle lighting device is detected by means of a temperature sensor such as a thermistor, and when the detected temperature of the temperature sensor exceeds a threshold value, a current of a light emitting element is decreased.

However, the vehicle lighting device that is configured as shown in FIG. 5 has been a device that is capable of carrying out current control due to a decrease of an input power supply, whereas the device is incapable of taking appropriate action such as an action of decreasing a current in a case where an ambient temperature increases; and therefore, the vehicle lighting device of such type has entailed a danger that a circuit or a light emitting diode may break.

Similarly, the vehicle lighting device that is configured as shown in FIG. 6 has been a device that is capable of carrying out current control due to a rise of an ambient temperature, whereas the device is incapable of taking an appropriate action such as decreasing a current in a case where an ambient temperature increases; and therefore, the vehicle lighting device of such type has entailed a danger that a circuit or a light emitting diode may break.

The present invention has been made in view of such a circumstance, and it is an object of the present invention to provide a vehicle lighting device that is configured in such a manner that a current that is supplied to a light emitting element that serves as a light source can be controlled in accordance with either of a voltage change in input power supply and a change in ambient temperature.

SUMMARY OF THE INVENTION

In order to achieve such an object, according to the present invention, a vehicle lighting device is configured in such a manner as to take out a reference voltage to be input to a switching controller from a voltage dividing resistor that is connected between a constant voltage source and a ground terminal, and is configured so as to include: between the input power supply and the ground terminal, a current control circuit for voltage change, which is adapted to supply a current that decreases a voltage of the voltage dividing resistor, to the voltage dividing resistor, in a case where a voltage of the input power supply decreases a preset value or less; between the constant voltage source and the ground terminal, a current control circuit for voltage change, which is adapted to supply a current that decreases a voltage of the voltage dividing resistor, to the voltage dividing resistor, in a case where a temperature that is detected by means of a temperature detection element increases to a preset value or more. With such a configuration, a current that is supplied to a light emitting element that serves as a light source can be controlled in accordance with a voltage change in input power supply and a change in ambient temperature.

The present invention will be understood by the following configuration.

(1) A vehicle lighting device in which a switching regulator, a voltage detection resistor, and a light emitting element are sequentially connected in series between an input power supply and a ground terminal, the vehicle lighting device comprising a switching controller controls a current that is supplied to the voltage detection resistor from the switching regulator and, controls a current that is supplied to the light emitting element, in accordance with a difference obtained by comparing a voltage that is detected from the voltage detection resistor and a reference voltage that is taken out from a voltage dividing resistor that is connected between a constant voltage source and the ground terminal, the vehicle lighting device further comprising:

between the input power supply and the ground terminal, a first current control circuit adapted to supply a current that decreases a voltage of the voltage dividing resistor, to the voltage dividing resistor, in a case where a voltage of the input power supply decreases to a preset value or less; and between the constant voltage source and the ground terminal, a second current control circuit adapted to supply a current that decreases a voltage of the voltage dividing resistor, to the voltage dividing resistor, in a case where a temperature that is detected by means of a temperature detection element increases to a preset value or more.

(2) The vehicle lighting device according to the configuration of (1), wherein the first current control circuit is made of: a differential circuit to which a current is supplied in a case where a voltage of the input power supply decreases to a preset value or less; and a current mirror circuit adapted to supply a current to the voltage dividing resistor in accordance with a flow of the current.

(3) The vehicle lighting device according to the configuration of (1), wherein the second current control circuit is made of: a differential circuit to which a current is supplied in a case where a temperature that is detected by means of a temperature detection element increases to a preset value or more; and a current mirror circuit adapted to supply a current to the voltage dividing resistor in accordance with a flow of the current.

(4) The vehicle lighting device according to the configuration of (1), wherein the temperature detection element of the second current control circuit is disposed in proximity to the light emitting element.

(5) The vehicle lighting device according to the configuration of (1), comprising a wired board adapted to mount at least the switching regulator and the switching controller, wherein the temperature detection element of the second current control circuit is disposed on the wired board.

(6) The vehicle lighting device according to the configuration of (1), comprising a box member adapted to house the wired board adapted to mount at least the switching regulator and the switching controller, wherein the temperature detection element of the second current control circuit is disposed in the box member.

(7) The vehicle lighting device according to the configuration of (1), comprising at least two second current control circuits including the second current control circuit, wherein the temperature detection elements are disposed at sites that are different from each other.

The vehicle lighting device thus configured can be provided in such a manner that a current that is to be supplied to a light emitting element that serves as a light source can be controlled with low power consumption in accordance with either of a voltage change in input power supply and a change in ambient temperature.

DESCRIPTION OF THE PREFERRED EMBODIMENTS

Figure 1:
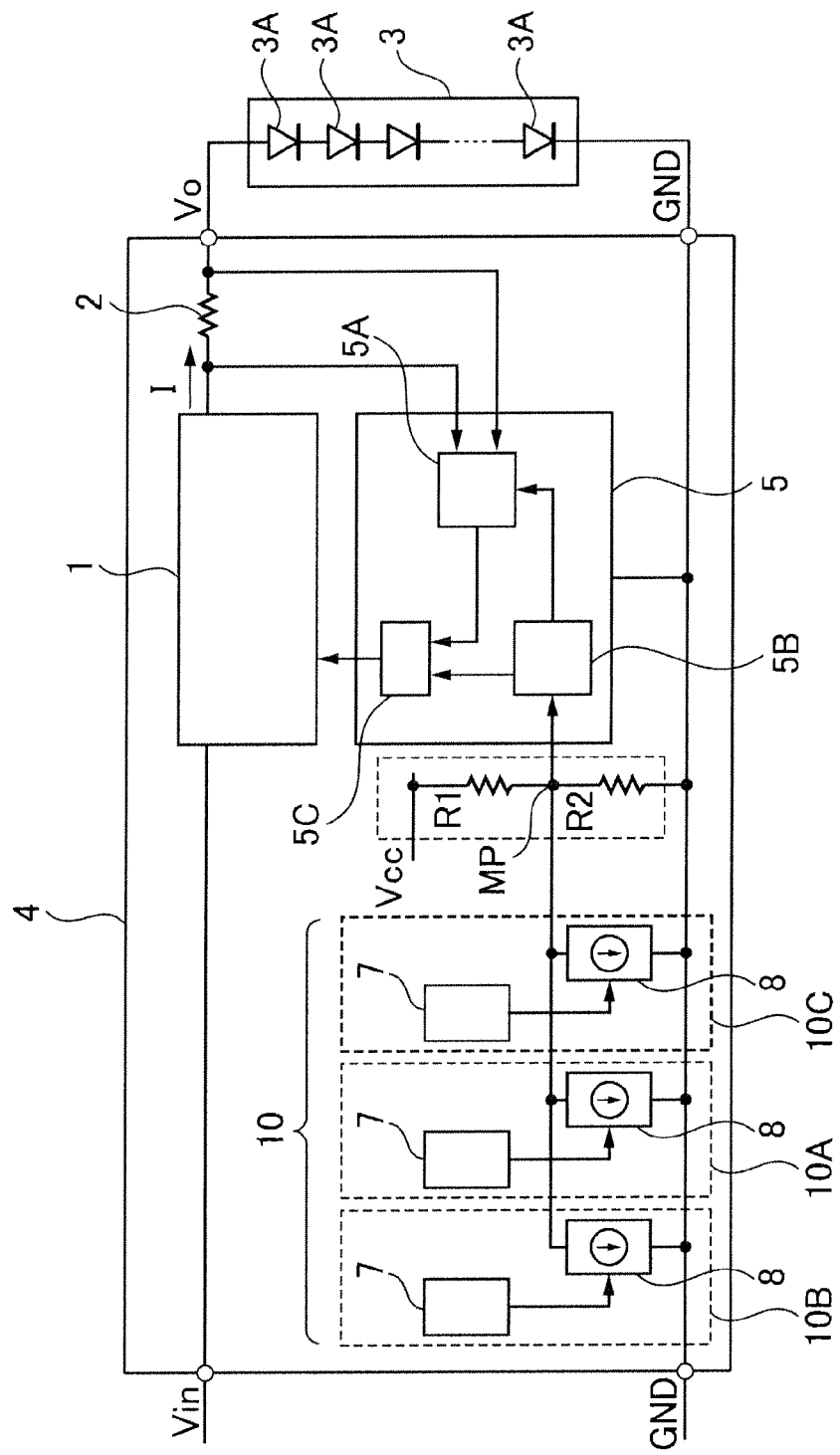
FIG. 1 is a block circuit diagram that depicts an entire vehicle lighting device according to a first embodiment of the present invention.

Hereinafter, preferred embodiments of the present invention (hereinafter, referred to as embodiments) will be described in detail with reference to the accompanying drawings. It is to be noted that like constituent elements are designated by like reference numerals throughout the description of the embodiments.

(First Embodiment)

FIG. 1 is a block circuit diagram depicting an entire vehicle lighting device according to a first embodiment of the present invention.

In FIG. 1, firstly, a switching regulator 1, a voltage detection resistor 2, and a light source 3 are sequentially connected in series between an input power supply terminal Vin to which power is to be supplied and a ground terminal GND. The light source 3 is made of a plurality of light emitting diodes 3A that are connected in series.

The input power supply terminal Vin, the ground terminal GND, the switching regulator 1, the voltage detection resistor 2, and electronic components, which will be described hereinafter, are configured so as to be mounted on a circuit board (a wired board) 4. The light source 3 is generally disposed so as to be comparatively distant from the circuit board 4; and therefore, apart from the circuit board 4, this light source is employed in such a manner that the light source is connected to an output power supply terminal Vo, which is provided on the circuit board 4, and the ground terminal GND.

The switching regulator 1 is provided in such a manner that a current that is supplied to the voltage detection resistor 2 and the light source 3 is controlled on the basis of PWM (Pulse-Width-Modulation) control, for example, from a switching controller 5 to be described later. The switching controller 5 is provided in such a manner that currents on both terminals of the voltage detection resistor 2 are input thereto, and is configured so as to include: a voltage detecting circuit 5A adapted to detect a voltage value that is applied to the voltage detection resistor 2 on the basis of these currents; a reference voltage detecting circuit 5B to which a voltage value that is controlled in accordance with a change in input power supply and a change in ambient temperature is to be input; and a PWM generating portion 5C adapted to compute a frequency that corresponds to a difference between the respective voltage values from the voltage detecting circuit 5A and the reference voltage detecting circuit 5B.

The reference voltage detecting circuit 5B is provided in such a manner that a voltage value that is controlled in accordance with a change in input power supply and a change in ambient temperature is input thereto by means of circuits described hereinafter. First, between the constant voltage source Vcc and the ground terminal GND, the resistor R1 and the resistor R2 are connected in series from the side of the constant voltage source Vcc, and between a middle connection point MP of the resistor R1 and the resistor R2 and the ground terminal GND, for example, three current control circuits 10 (a current control circuit 10A, a current control circuit 10B, and a current control circuit 10C) are connected in parallel. Although configurations of these current control circuits 10 will be described later in detail, the current control circuit 10A is configured in such a manner as to supply a current that decreases a voltage of the resistor R2, to the resistor R2 that serves as a voltage dividing resistor, in a case where an ambient temperature of the circuit board 4 increases to a preset value or more. In addition, the current control circuit 10B is configured in such a manner as to supply a current that decreases a voltage of the resistor R2, to the resistor R2, in a case where an ambient temperature of the light source 3 increases to a preset value or more. Further, the current control circuit 10C is configured in such a manner as to supply a current that decreases a voltage of the resistor R2, to the resistor R2, in a case where a voltage of an input power supply from the input power supply terminal Vin decreases to a preset value or less. Although described later in detail, it is to be noted that the current control circuit 10A, the current control circuit 10B, and the current control circuit 10C each are made of: a differential amplification circuit adapted to generate a current in a case where a predetermined voltage or more is detected, for example; and a current mirror circuit adapted to generate a current that is based on the current, in a mirror-like manner.

Furthermore, a voltage at the middle connection point MP of the resistor R1 and the resistor R2, in other words, a voltage between the resistors R1 and R2, are input to the reference voltage detecting circuit 5B. In this manner, the reference voltage detecting circuit 5B is capable of generating a reference voltage that corresponds to an ambient temperature of the circuit board 4, an ambient temperature of the light source 3, and a voltage in input power supply, each of which changes independently, and the PWM generating portion 5C is capable of carrying out appropriate control for the switching regulator 1, in accordance with a detected voltage from the voltage detection resistor 2 on the basis of the reference voltage.

Figure 2:
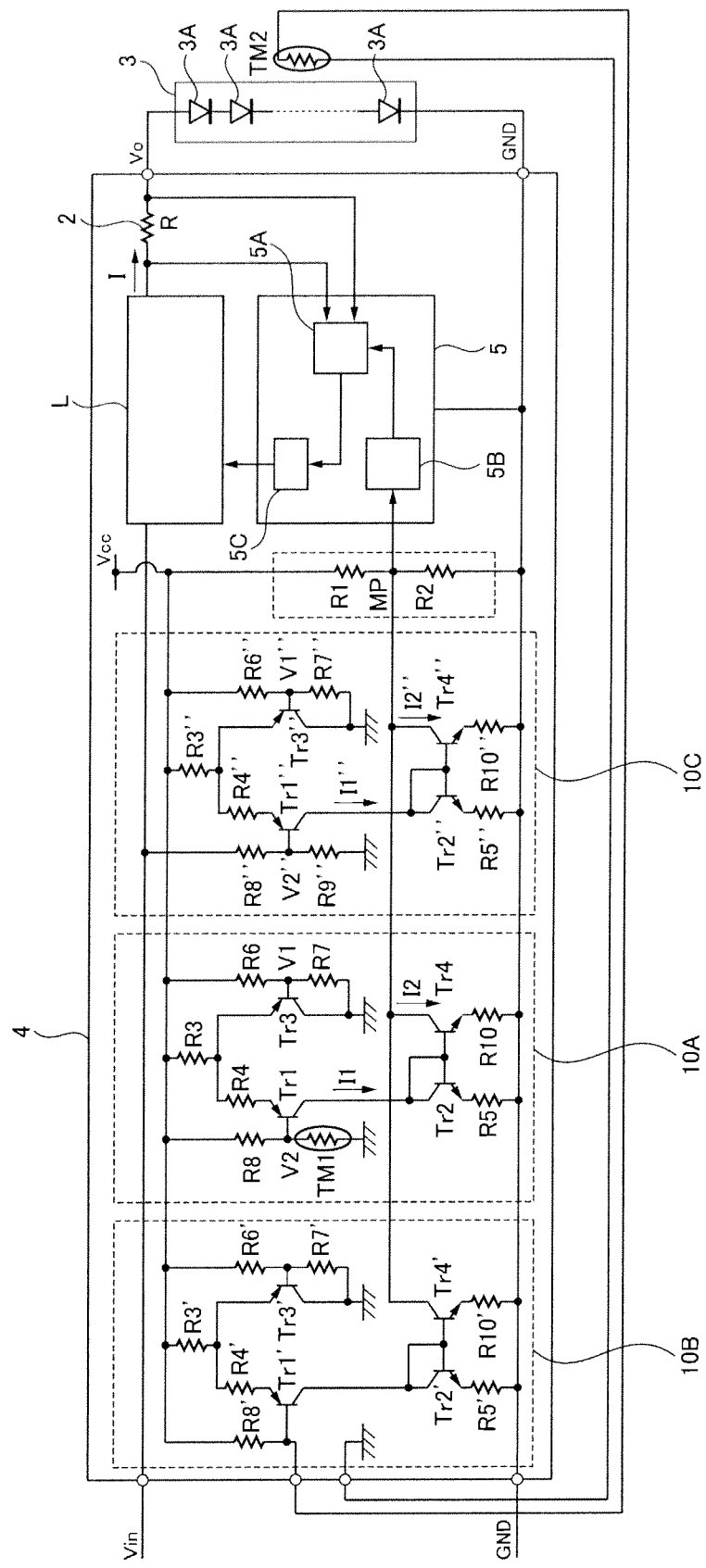
FIG. 2 is a circuit diagram that is drawn in association with FIG. 1, the diagram specifically depicting current control circuits 10A, 10B, and 10C.

FIG. 2 is a circuit diagram that is drawn in association with FIG. 1, the diagram specifically depicting the respective circuits, in other words, the current control circuit 10A, the current control circuit 10B, and the current control circuit 10C.

In FIG. 2, the current control circuit 10A is provided in such a manner that between the constant voltage source Vcc and the ground terminal GND, a resistor R3, a resistor R4, a PNP transistor Tr1, an NPN transistor Tr2, and a resistor R5 are first sequentially connected in series from the side of the constant voltage source Vcc, and a PNP transistor Tr3 is then connected between a middle connection point of the resistor R3 and the resistor R4 and the ground terminal GND. The NPN transistor Tr2 is provided in such a manner that its related collector and base are connected to each other. Between the constant voltage source Vcc and the ground terminal, a base of the PNP transistor Tr3 is connected to a middle connection point between a resistor R6 and a resistor T7 that are sequentially connected in series from the side of the constant voltage source Vcc. Between the constant voltage source Vcc and the ground terminal GND, a base of the PNP transistor Tr1 is connected to a middle connection point between a resistor R8 and a first thermistor (a temperature detection element) TM1 that are sequentially connected in series from the side of the constant voltage source Vcc. The first thermistor TM1 is mounted on the circuit board 4 in a similar manner as that of the periphery electric components. This is because control is carried out in such a manner as to eliminate a change in feature that is exerted by a temperature of a transistor or the like that is mounted on the circuit board 4.

Here, the PNP transistor Tr1, the PNP transistor Tr3, the resistor R3, the resistor R4, the resistor R6, the resistor R7, resistor R8, and the first thermistor TM1 are adapted to configure the differential amplification circuit 7. In addition, between the connection point MP of the resistor R1 and the resistor R2 and the ground terminal GND, the NPN transistor Tr4 and a resistor R10 are sequentially connected from the side of the connection point MP, and a base of the NPN transistor Tr4 is connected to a base of the NPN transistor Tr2. Here, the NPN transistor Tr2, the NPN transistor Tr4, the resistor R5, and the resistor R10 are provided so as to configure the current mirror circuit 8.

The current control circuit 10A thus configured is provided in such a manner that its related operation shown below is made.

Figure 3:
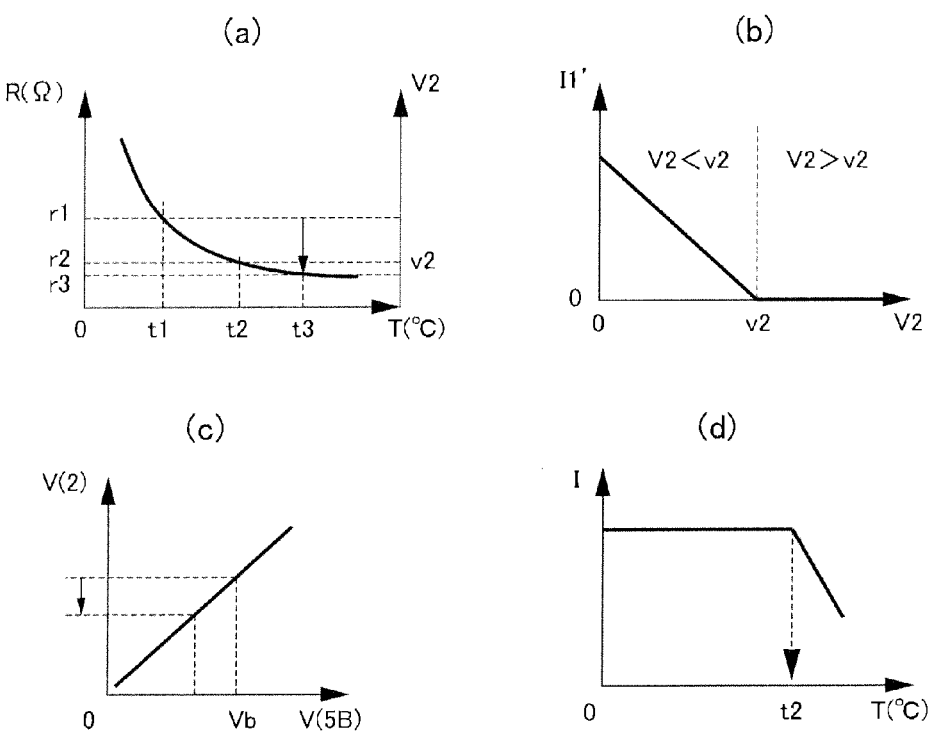
FIG. 3 is a graph that is employed in description of operation of the current control circuit 10A shown in FIG. 2.

First, a predetermined voltage V1 that is obtained by dividing a voltage of the constant voltage source Vcc by means of the resistor R6 and the resistor R7 is applied to a base of the PNP transistor Tr3. In contrast, a voltage V2 that is obtained by dividing the voltage of the constant voltage source Vcc by means of the resistor R8 and the first thermistor TM1 is applied to a base of the PNP transistor Tr1. The first thermistor TM1 has a feature that a resistance value decreases in a case where an ambient temperature of the circuit board 4 increases. FIG. 3 (a) is a graph depicting an interrelationship between a peripheral temperature T (degrees Centigrade) of the first thermistor TM1 and its related resistance R (Ω) that corresponds thereto. As is evident from the graph, in a case where the ambient temperature increases to t1, t2, and t3 in the figure, a resistance of the first thermistor TM1 also sequentially decreases to r1, r2, and r3 in accordance with such a sequential rise. In the figure herein, the ambient temperature t2 denotes a target temperature that corresponds to a set current that is supplied to the light source 3. Thus, in a case where the ambient temperature of the first thermistor TM1 increases, the voltage V2 that is applied to the base of the PNP transistor Tr1 changes so that the voltage decreases. It is to be noted that, in the graph depicted in FIG. 3 (a), the voltage V2 is indicated on a vertical axis, and the voltage V2 that corresponds to the target temperature is indicated by v2.

FIG. 3 (b) is a graph depicting a collector current I1 that is supplied to the transistor Tr1 with respect to the voltage V2. As depicted in the graph, in a case where the voltage V2 is greater than the voltage v2 that corresponds to the target temperature (V2>v2), a collector current I1 of the PNP transistor Tr1 is not supplied, or alternatively, in a case where the voltage V2 becomes smaller than the voltage v2 (V2<v2), the collector current I1 of the NPN transistor Tr1 is supplied in accordance with a difference therebetween. Thus, in a case where the ambient temperature of the first thermistor TM1 is equal to or greater than a predetermined temperature, the collector current I1 is produced and then the collector current I1 is supplied to the NPN transistor Tr2.

In this manner, a current I2, for example, which is identical to the collector current I1 (I2=I1), is supplied to the NPN transistor Tr4, and a current that is supplied to the resistor R1 increases, whereas a voltage at the connection point MP of the resistor R1 and the resistor R2, in other words, a reference voltage for the reference voltage detecting circuit 5B decreases. In this manner, the switching controller 5 controls the switching regulator 1 on the basis of the decreased reference voltage, and the current that is supplied to the side of the voltage detection resistor 2 and the light source 3 decreases.

FIG. 3 (c) shows a graph depicting an interrelationship between a reference voltage V (5B) for the reference voltage detecting circuit 5B and a voltage V (2) that is obtained from the voltage detection resistor 2. As depicted in the graph, the current I2 is not supplied to the reference voltage detecting circuit 5B that corresponds to the target temperature t2 yet until the reference voltage V (B5) for the reference voltage detecting circuit 5B decreases to a reference voltage (indicated by Vb in the figure) of the reference voltage detecting circuit 5B, the reference voltage corresponding to the target temperature t2; and therefore, its related voltage is retained. Afterwards, its related temperature reaches the target temperature t2 or more and then the current I2 is supplied, whereby the voltage of the resistor R2 decreases due to an increase in voltage of the resistor R1, and the reference voltage V (5B) for the reference voltage detecting circuit 5B decreases, accordingly. In this case, the voltage V (2) that is obtained from the voltage detection resistor 2 also decreases concurrently with a decrease in the reference voltage V (5B).

FIG. 3 (d) is a graph depicting an interrelationship between a detected temperature T (degrees Centigrade) of the first thermistor TM1 and its related output current I from the switching regulator 1. As depicted in the graph, an output current from the switching regulator 1 is retained at a constant level until the detected temperature from the switching regulator 1 has reached the target temperature t2, whereas in a case where the target temperature t2 has been exceeded, the output current I decreases in accordance with such an excess.

The current control circuit 10A thus configured is provided in such a manner as to supply a current that decreases a voltage of the resistor R2, to the resistor R2, in a case where the detected temperature of the first thermistor TM1 that is mounted on the circuit board 4 increases to a preset value or more, thus making it possible to appropriately control the current that is supplied to the light source 3.

The current control circuit 10B is made of the constituent elements that are substantially identical to those of the current control circuit 10A. Thus, resistors and transistors that configure the current control circuit 10B are designated by like reference numerals assigned to the corresponding resistors and transistors of the current control circuit 10A, each of which is marked with apostrophe ' at its shoulder. A difference in configuration between the current control circuit 10B and the current control circuit 10A lies in the fact that a second thermistor (a temperature detection element) TM2 that is included in the current control circuit 10B is disposed in proximity to the light source 3. This is because control is carried out in such a manner as to eliminate a change in feature exerted by a temperature in light emitting diode 3A that configures the light source 3.

An operation of the current control circuit 10B, as is the case with the current control circuits 10, is configured in such a manner as to supply a current that decreases a voltage of the resistor R2, to the resistor R2, in a case where a detected temperature of the second thermistor TM2 that is adjacent to the light source 3 increases to a preset value or more. Thus, a current that is supplied to the light source 3 can be appropriately controlled in a similar manner as that of the current control circuit 10A.

The current control circuit 10C is made of the constituent elements that are substantially identical to those of the current control circuit 10A. Thus, resistors and transistors that configure the current control circuit 10C are designated by like reference numerals assigned to the corresponding resistors and transistors of the current control circuit 10A, each of which is marked with apostrophe " at its shoulder. A difference in configuration between the current control circuit 10B and the current control circuit 10A is that the resistor R8" and the resistor R9" that are sequentially connected in series from the side of the input power supply terminal Vin are connected between the input power supply terminal Vin and the ground terminal GND, and a voltage at a middle connection point of these resistors R8" and R9" is supplied to a base of the transistor Tr1".

In other words, the current control circuit 10C is provided in such a manner that a resistor R3", a resistor R4", a PNP transistor Tr1", an NPN transistor Tr2", and a resistor R5" are sequentially connected in series from the constant voltage source Vcc between the constant voltage source Vcc and the ground terminal GND, and a PNP transistor Tr3" is connected between a middle connection point of the resistor R3" and the resistor R4" and the ground terminal GND. Between the input power supply terminal Vin and the ground terminal GND, a base of the PNP transistor Tr1", as described above, is connected to a middle connection point of the resistor R8" and the resistor R9" that are sequentially connected in series from the side of the input power supply terminal Vin. The NPN transistor Tr2" is provided in such a manner that its related collector and base are connected to each other. Between the constant voltage source Vcc and the ground terminal GND, a base of the PNP transistor Tr3" is connected to a middle connection point of the resistor R6" and the resistor R7" that are sequentially connected in series from the side of the constant voltage source Vcc. In addition, between the connection point MP of the resistor R1 and the resistor R2 and the ground terminal GND, a NPN transistor Tr4" and the resistor R10" are sequentially connected from the side of the connection point MP, and a base of the NPN transistor Tr4" is connected to a base of the NPN transistor Tr2".

The current control circuit 10C thus configured is provided in such a manner that its related operation shown below is made.

First, a predetermined voltage V1" that is obtained by dividing a voltage of the constant voltage source Vcc by means of the resistor R6" and the resistor R7" is applied to a base of the PNP transistor Tr3". In contrast, a voltage V2" that is obtained by dividing a voltage o the input power supply terminal Vin by means of the resistor R8" and the resistor R9" is applied to a base of the PNP transistor Tr1".

Figure 4:
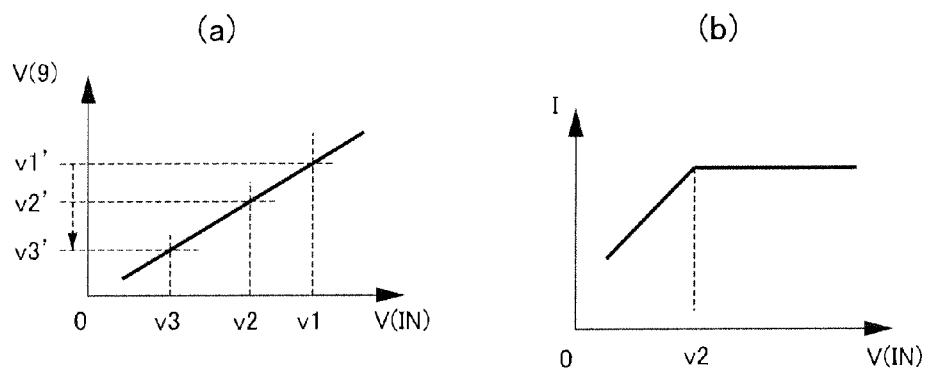
FIG. 4 is a graph that is employed in description of operation of the current control circuit 10C shown in FIG. 2.
Figure 5:
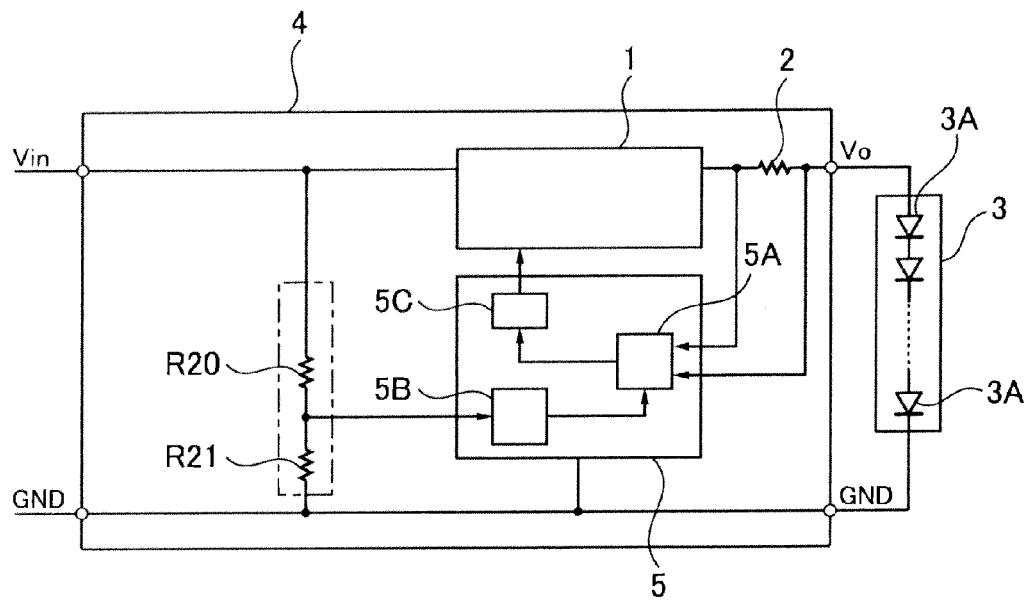
FIG. 5 is a circuit diagram that depicts an example of a conventional vehicle lighting device.
Figure 6:
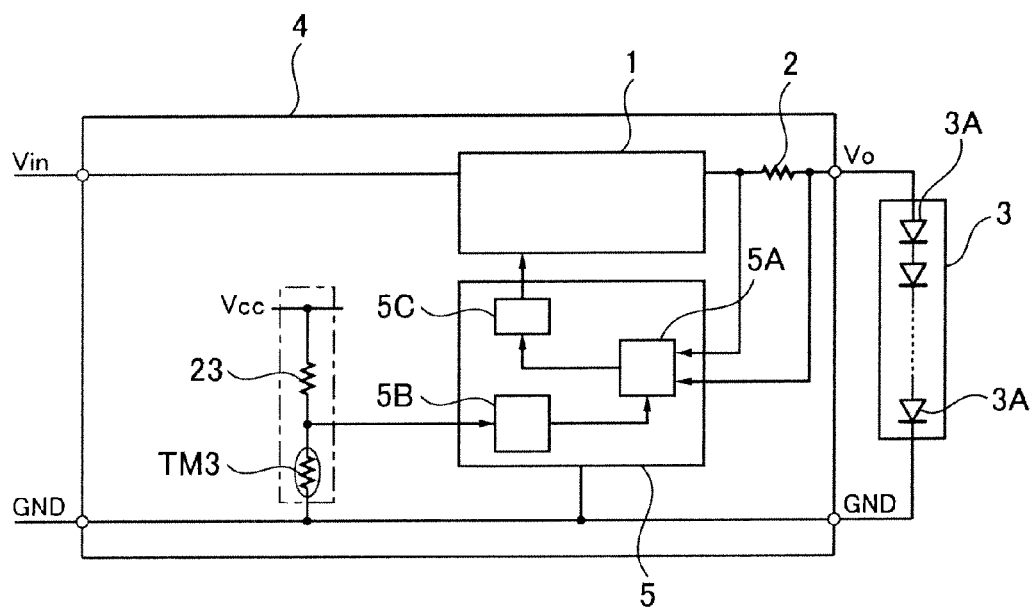
FIG. 6 is a circuit diagram that depicts another example of a conventional vehicle lighting device

FIG. 4 (a) is a graph depicting an interrelationship between a voltage V (IN) of the input power supply terminal Vin and its related resistance voltage V (9) that is applied to the resistor R9". As is evident from the graph, in a case where the voltage V (IN) of the input power supply terminal Vin sequentially decreases to v1, v2, and v3 in the figure, the resistance voltage V (9) that is applied to the resistor R9" also sequentially decreases to v1', v2', and v3' in accordance with such a sequential decrease. In the figure, the voltage v2 is a target voltage that corresponds to a set current that is supplied to the light source 3.

After that, as is the case with the current control circuit 10A, in a case where the voltage V (IN) is greater than the target voltage v2 (V (IN)>v2), a collector current I1" of the PNP transistor Tr1" is not supplied, and in a case where the voltage V (IN) is smaller than the voltage v2 (V (IN)<v2), a collector current I1" of the NPN transistor Tr1" is supplied in accordance with a difference therebetween. Thus, in a case where the voltage V (IN) of the input power supply terminal Vin decreases to a predetermined voltage or less, a collector current I1" is produced and then the collector current I1" is supplied to the NPN transistor Tr2".

In this manner, a current I2", for example, which is identical to the collector current I1" (I2"=I1"), is supplied to the NPN transistor Tr4, a current that is supplied to the resistor R1 increases and then a reference voltage at the connection point MP of the resistor R1 and the resistor R2, in other words, a reference voltage for the reference voltage detecting circuit 5B decreases. In this manner, the switching controller 5 controls the switching regulator 1 on the basis of the decreased reference voltage, and a current that is to be supplied to the voltage detection resistor 2 and the light source side decreases.

FIG. 4 (b) is a graph depicting an interrelationship between the voltage V (IN) of the input power supply terminal Vin and its related output current I from the switching regulator 1. As depicted in the graph, an output current from the switching regulator 1 is retained at a constant level until the voltage V (IN) of the input power supply terminal Vin has reached a target voltage v2, whereas in a case where the target voltage v2 has been exceeded, the output current decreases in accordance with such an excess.

The current control circuit 10C thus configured is provided in such a manner as to supply a current that decreases a voltage of the resistor R2, to the resistor R2, in a case where the voltage of the input power supply terminal Vin decreases to a preset value or less; and therefore, a current that is supplied to the light source 3 can be appropriately controlled with low power consumption.

As is evident from the foregoing description, the vehicle lighting device according to the embodiment can be configured in such a manner that a current that is supplied to a light emitting element that serves as a light source can be controlled with low power consumption in accordance with either of a voltage change in input power supply and a change in ambient temperature.

(Second Embodiment)

In the foregoing embodiments, the first thermistor TM1 that is included in the current control circuit 10B is shown as a thermistor that is mounted on the circuit board 4. However, in a case where a box member made of a shield material, for example, the box member housing the circuit board 4, is provided, it is a matter of course that the first thermistor TM1 may be configured in such a manner as that the thermistor is disposed in the box member. This is because a similar advantageous effect can be attained.

(Third Embodiment)

The foregoing embodiment has described a configuration that is provided with the three current control circuits 10 (the current control circuit 10A, the current control circuit 10B, and the current control circuit 10C). However, the number of the current control circuits 10 is not limited, and this configuration may be provided with three or more like current control circuits, a pair of the current control circuits 10A and 10C, or alternatively, a pair of the current control circuits 10B and 10C.

While the present invention has been described by way of embodiments, it is a matter of course that the technical scope of the present invention is not limited to the subject matter described in the foregoing embodiments. It is self-evident that various modifications or alterations can occur to one skilled in the art. In addition, it is evident from the subject matters of the claims that a mode for which such modifications or alterations have been made can also be encompassed in the technical scope of the present invention.

What is claimed is:

1. A vehicle lighting device in which a switching regulator, a voltage detection resistor, and a light emitting element are sequentially connected in series between an input power supply and a ground terminal, the vehicle lighting device comprising a switching controller controls a current that is supplied to the voltage detection resistor from the switching regulator and, controls a current that is supplied to the light emitting element, in accordance with a difference obtained by comparing a voltage that is detected from the voltage detection resistor and a reference voltage that is taken out from a voltage dividing resistor that is connected between a constant voltage source and the ground terminal, the vehicle lighting device further comprising:

between the input power supply and the ground terminal, a first current control circuit adapted to supply a current that decreases a voltage of the voltage dividing resistor, to the voltage dividing resistor, in a case where a voltage of the input power supply decreases to a preset value or less; and between the constant voltage source and the ground terminal, a second current control circuit adapted to supply a current that decreases a voltage of the voltage dividing resistor, to the voltage dividing resistor, in a case where a temperature that is detected by means of a temperature detection element increases to a preset value or more.

2. The vehicle lighting device according to claim 1, wherein the first current control circuit is made of: a differential circuit to which a current is supplied in a case where a voltage of the input power supply decreases to a preset value or less; and a current mirror circuit adapted to supply a current to the voltage dividing resistor in accordance with a flow of the current.

3. The vehicle lighting device according to claim 1, wherein the second current control circuit is made of: a differential circuit to which a current is supplied in a case where a temperature that is detected by means of a temperature detection element increases to a preset value or more; and a current mirror circuit adapted to supply a current to the voltage dividing resistor in accordance with a flow of the current.

4. The vehicle lighting device according to claim 1, wherein the temperature detection element of the second current control circuit is disposed in proximity to the light emitting element.

5. The vehicle lighting device according to claim 1, comprising a wired board adapted to mount at least the switching regulator and the switching controller, wherein the temperature detection element of the second current control circuit is disposed on the wired board.

6. The vehicle lighting device according to claim 1, comprising a box member adapted to house the wired board adapted to mount at least the switching regulator and the switching controller, wherein the temperature detection element of the second current control circuit is disposed in the box member.

7. The vehicle lighting device according to claim 1, comprising at least two second current control circuits including the second current control circuit, wherein the temperature detection elements are disposed at sites that are different from each other.

\* \* \* \* \*